United States Patent [19]

Rousseau et al.

[11] 4,453,418

[45] Jun. 12, 1984

[54] FLOW-METER FOR FLUIDS, WITH CONSTANT PRESSURE LOSS

[75] Inventors: Alain Rousseau, Paris; François Ramel, Levallois-Perret, both of France

[73] Assignee: EFFA Etudes, Societe a Responsabilité Limiteé, Paris, France

[21] Appl. No.: 353,714

[22] Filed: Mar. 1, 1982

[30] Foreign Application Priority Data

Mar. 12, 1981 [FR] France ................... 81 04961

[51] Int. Cl.³ ............................................. G01F 1/22
[52] U.S. Cl. ................................................ 73/861.58
[58] Field of Search ...................... 73/861.58, 861.53

[56] References Cited

U.S. PATENT DOCUMENTS

| | | | |
|---|---|---|---|
| 1,187,607 | 6/1916 | Carney et al. | 73/861.58 |
| 2,273,331 | 2/1942 | Rowerdink | 73/861.58 |
| 3,234,790 | 2/1966 | Ekstrom | 73/861.58 |
| 3,513,711 | 5/1970 | Rogall et al. | 73/517 B |
| 4,297,899 | 11/1981 | Blaney et al. | 73/861.58 |

FOREIGN PATENT DOCUMENTS 1190912  5/1970  United Kingdom ............ 73/861.58

*Primary Examiner*—S. Clement Swisher
*Assistant Examiner*—Brian R. Tumm
*Attorney, Agent, or Firm*—Dowell & Dowell

[57] ABSTRACT

This flow-meter comprises an enclosure separated into two chambers by a flexible and sealed diaphragm fast at its center with a rigid dome. A compression spring presses the dome, which is pierced in its center with a hole, upon a cone fast with the enclosure, and exerts a constant force upon the dome. The fluid penetrates into the flow-meter through the orifice, passes between the cone and the dome which it raises, and emerges through the orifice. A contactless displacement detector measures the displacement of the dome which is proportional to the flow rate of the fluid.

7 Claims, 3 Drawing Figures

FLOW-METER FOR FLUIDS, WITH CONSTANT PRESSURE LOSS

BACKGROUND OF THE INVENTION

The invention relates to a flow-meter for measuring the rates of flow of fluids, more particularly adapted to the requirements of measurement in the field of automobiles, especially for fuel measurement.

Characteristics of the automobile field include the very wide range of operating temperatures (−40° C. to +125° C.), the stresses of vibrations and impacts, the presence of corrosive agents. Finally and primarily, the essential characteristic is the necessity of very low cost whilst maintaining good performances.

The list of specifications of an automobile fuel flow-meter is roughly as follows:
  measurement range: from 0.5 to 50 liters per hour, to avoid duplication of ranges;
  compensated operating temperature: −30° C. to +80° C.; operating temperature: −40° C. to +125° C.;
  impacts and vibrations: impacts 50 g., vibrations 3 g.±10 mm. from 5 to 50 Hz in the three dimensions;
  loss of pressure less than 40 mbars;
  indifference to bubbles;
  indifference to pulsating flow with reversal of the direction of circulation;
  density of the fuel: 0.745±3%, with a temperature coefficient of $8.5 \cdot 10^{-4}$ per °C.;
  instantaneous measurement precision better than 10%;
  cumulative measurement precision, taking account of all variations, better than 5%;
  small bulk and ease of fitting;
  analog or numerical (frequency) output signal with a preference for numerical;
  reduced electrical connections.

Let it be noted that this list of specifications opens up many applications other than the field of automobiles.

As regards indication, analog indication is useful for operational learning of economical driving, while numerical indication permits quantitatively monitoring the consumption, which then requires maximum possible precision.

At present, different techniques seek to respond to all these requirements. First there are axial turbine flowmeters, which have the drawback of being sensitive to bubbles and of having internal frictions which render their precision poor at low flow rates (below 3 l./h.). Moreover the fact that it is not possible to standardize them or effect compensation simply necessitates precise and costly manufacture. They possess the advantages of simplicity of their electronics and the directly numerical character of their read-out.

A flow-meter type with a tangential turbine currently has characteristics which make it a very valid apparatus. However, despite the fact that at low flow rates its operation is better than that of preceding apparatuses, it also possesses the same drawbacks.

A flow-meter close to the invention here described in principle is a flow-meter having a pressure loss which is not zero at zero flow rate, then increases as a function of the flow rate. A cone is displaced, under the effect of the pressure generated by the flow rate, in another, fixed, cone of smaller angle. A spring tends to apply the first cone to the second. A rod fast with the first permits measurement of the displacement by a differential transformer. In the case of this detector only the force exerted upon the first cone by the pressure due to the pressure loss at the level of the throttling action between the cones displaces the first cone. In view of the necessary small section of the first cone, thus the force is very slight and subject to interference by numerous parameters (friction, inclination, etc.). Moreover the throttling effect between the cones is such that the pressure losses by friction are not zero and that they greatly disturb the measurement at low flow rates. Moreover these pressure losses depend upon the viscosity of the fluid, the value of which moves by about 10% per 10° C., which causes a large temperature drift. Finally this technique necessitates an almost perfect centering of the fixed part in relation to the movable part.

A different flow-meter type is a differential pressure pick-up flow-meter utilising a contactless displacement pick-up. The drawback of this apparatus, apart from its low dynamics (0.5 to 25. l./h.), is the imperfect stability of its zero, due to the fact that the pressure loss is approximately quadratic and that the gain must be very large at low flow rates, rendering the apparatus sensitive to several stray parameters such as swelling of the diaphragm, inclination of the apparatus, hysteresis of the springs.

Its advantages are its low cost price, the fact that it has low sensitivity to bubbles, the fact that in itself it constitutes a fluid filter permitting excellent operation in pulsating or impulse rate, that it is equipped with an analog transducer which permits standardisation and thus a widening of the mechanical tolerances, and that it can be temperature-compensated.

OBJECT OF THE INVENTION

The invention in question here seeks to retain the advantages of that apparatus and eliminate its drawbacks, yet conforming with the list of specifications as defined above.

SUMMARY OF THE INVENTION

A flow-meter according to the invention is an apparatus with pressure loss almost independent of the flow rate, utilising the energu of a pump and permitting the avoidance of harmful parameters at low flow rates. The pressure loss is a loss almost exclusively by impacts. The displacement to be measured is linear as a function of the flow rate, and does not display an initial sharp bend. Finally the transducer permitting the contactless displacement measurement can advantageously be an eddy-current pick-up forming the object of a patent application and particularly adapted to the problem, especially as regards the zero stability.

Thus the flow-meter according to the invention comprises a hermetically sealed enclosure separated into two chambers by a movable element and connectable to the conduit, in which the fluid flows the flow rate of which it is intended to measure, by an entry orifice formed in the first chamber and by an exit orifice formed in the second chamber, the said enclosure comprising the means for introducing a pressure loss between entry and exit, that is to say a differential pressure between the two chambers almost independent of the flow rate, the said means thereby permitting monitoring of the fluid passage section by a linear displacement of the movable element as a function of the flow rate, and means for measuring the displacement of the said movable element, and is characterised in that the said means comprise a circular, flat, rigid dome pierced with a central hole and connected by a flexible and sealed element to the body of the enclosure, a cone fast with the enclosure body and the axis of which is perpendicular to the plane of the dome and passes through its center, means for applying to the dome an almost constant force tending to apply the edge of the hole of the dome to the cone and permitting displacement of the dome in the direction of the axis of the cone, and a contactless transducer element which converts the said displacement into a signal representing the flow rate.

Further characteristics and the advantages of the invention will appear in the course of the following description.

DESCRIPTION OF PREFERRED EMBODIMENT

Figure 1:
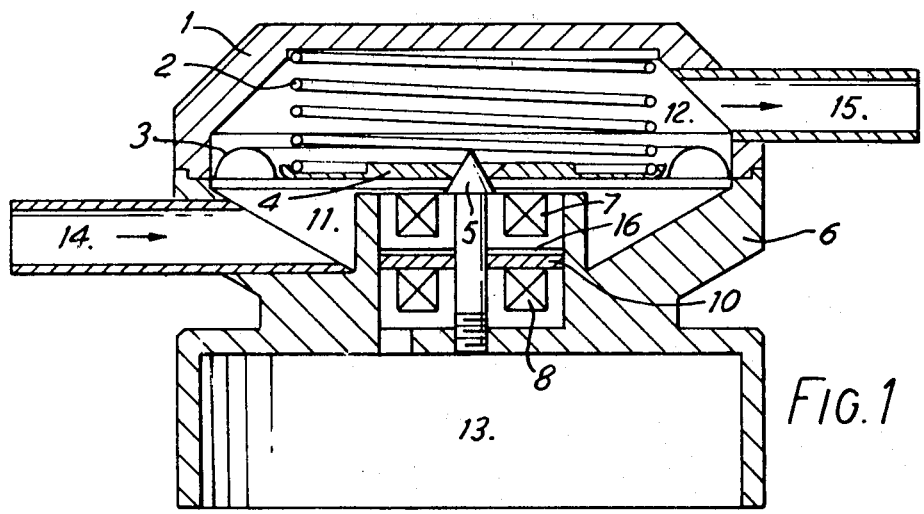
FIG. 1 is a vertical sectional view along the line A—A in FIG. 2, according to the preferred form of the invention.
Figure 2:
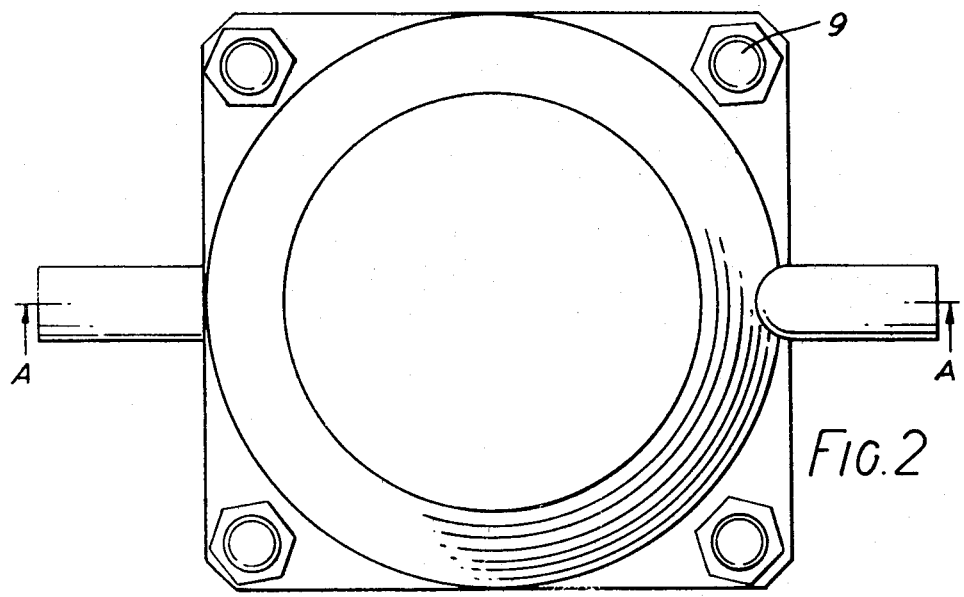
FIG. 2 shows a plan view of the apparatus.

The apparatus is presented in the form of a body essentially composed of two parts 1 and 6 fitted into one another and assembled by screws such as 9, forming a lower chamber 11 and an upper chamber 12 separated by a diaphragm 3 fast with the dome 4. 14 is the fluid entry conduit and 15 the exit conduit.

The diaphragm, which is for example semi-toroidal, is made of a rubber material resistant to hydrocarbons, such as nitrile. A metallic diaphragm would be poorly suitable since it would permit only a very slight displacement. The diaphragm can be made by compression or injection or by the use of very fine fabric (of thickness below 0.2 mm. for example) coated with rubber and shaped in a mould.

It is seen that the dome 4 is pierced with a hole the lower edge of which presses upon the cone 5. In the drawing the dome is shown chamfered in order to minimize the impact losses and to limit the losses by viscosity. However tests have shown that it is possible alternatively to form a straight hole. The essential condition for good functioning is that the edge of the hole formed in the dome and resting, at zero flow rate, on the cone should be as straight and sharp as possible. Such a realization can be made with the aid of a punching or stamping tool. The dome possesses a thickness of 1.5 mm. in order to avoid deforming under the effect of the force exerted by the spring 2 which tends to urge it against the cone 5. The diaphragm is secured by adhesion to the dome, but can be fixed by other mechanical means. The dome 4 is of non-magnetic material, such as an aluminum alloy.

The helical compression spring 2, being very flexible, and having a great unloaded height, exerts upon the dome the force which determines the operating pressure of the apparatus, for example 40 mm. unloaded and 10 mm. compressed. This spring is selected to be very flexible in order that the displacement caused by the flow rate may not cause a great relative variation of the force exerted upon the dome.

The cone 5, in the case of the present solution, is a cut-out metallic piece which passes through the central hole of the coils 7 and 8 contained in ferrite half-pots which constitute the sensitive part of the eddy-current displacement detector, comes to grasp the parts 10 and 16 and is screwed into the body 6. Its angle is 60°. Thus the fluid finds an entry angle of 60° and an exit angle of 30° to 120° according to the chamfering of the upper edge of the hole of the dome.

A different cone angle is possible, for example 45°. It would permit an entry angle equal to the exit angle in the case where the dome is pierced with a straight hole.

A version in charged plastic (glass-charged polyamide or glass-charged polybutylene terephthalate) permits reduction of the number of parts. In fact in this version the coils are placed in the coil well on the electronic circuit side and a cloth of 0.5 to 0.7 mm. thickness connects the top of the coil well to the base of the cone. Likewise the centering rod of the cone occurs as the moulding issues. This solution permits elimination of all sealing problems, especially facilitates the coating of the coils and permits good thermal stability thanks to the rod which passes through the coils and ensures cohesion of the whole. This solution further permits simplified assembly.

Whichever solution is used for the formation of the body, the coils must be coated under vacuum with the aid of a charged epoxy resin having a low coefficient of linear expansion and good thermal characteristics.

The coil 7 contained in a ferrite half pot faces the dome 4 and constitutes the measuring coil. When the dome is displaced under the action of a flow, there is modification of the eddy currents circulating therein and variation in the apparent inductance of the coil. The other coil faces either the flow-meter body, if it is for example of cast aluminum, or a washer 16 of the same metal (in the present example) as dome 4. Between the coil 8, contained in a ferrite half-pot, and this washer 16, a stay-piece 10, constituted of a preferably insulating material with a linear coefficient of expansion close to that of the material of the cone, ensures that the distance between the ferrite half-pot of the coil 8 and the washer 16 is very close to the distance existing between the ferrite half-pot of the coil 7 and the dome 4 when there is no flow. Allowing for manufacturing tolerances, a deviation of a few hundredths of a millimeter is possible.

The wires of the coils pass directly to the electronic circuit contained in the casing 13 which circuit is the essential complement of the eddy-current displacement detector. This circuit, placed in the casing, permits integrating the desired temperature compensations. The eddy-current detector will not be set forth in detail here, only its particular features due to the requirements inherent in the type of flow-meter described here will be indicated.

The flow-meter is placed in a fuel circuit the flow rate of which it is desired to measure. The fluid enters through the orifice 14, then penetrates into the chamber 11. Without pressure the fluid cannot flow. As the fuel circuit pump supplies a pressure, the necessary differential pressure is reached to raise the assembly of diaphragm and dome. The fluid can then pass between the cone and the dome, with a pressure loss which is in any case equal to the calibration pressure determined by the force exerted by the spring upon the dome, distributed over the effective area of the diaphragm. Thus a displacement of the dome corresponds to a flow rate. The contactless displacement detector then measures this displacement in relation to the zero flow rate position. The displacement is an almost linear function of the flow rate.

Thus several points are observed:

1. The calibration Δp is such that it varies little as a function of the flow rate (less than 5%). 2. By reason of the angles which the cone forms with the dome (60° at the entry and 30° to 90° at the exit) and by reason of the short length of contact between the cone and the dome, the pressure loss is almost purely a pressure loss by impacts, which means that it can be expressed in first approximation:

| (A) $\Delta p = \tfrac{1}{2}\rho v^2$ | $\rho$: density |
| --- | --- |
| | v: speed of the fluid |
| (B) where $v = q_v/S$ | $q_v$: volume flow rate |
| | S: passage section | the passage section is expressed (C) $S = 2\pi R e$ wherein R is the section of the cone and e is the distance between the extremity of the dome and the cone, thus we have:

(D) $e = \sqrt{\dfrac{3\rho}{\Delta p}} \cdot \dfrac{qv}{4\pi R}$

Thus the distance is proportional to the flow rate. As a trigonometrical ratio exists between the distance e and the displacement of the dome in a direction parallel to the axis of the cone, the displacement is proportional to the flow rate.

For exact calculations, for S there must be taken:

(E) $S = \pi(R+e)^2 - \pi R^2$ $S = \pi(2Re + e^2)$.

The approximate formula (D) shows that:

(F) $\dfrac{de}{e} = \dfrac{d\rho}{2\rho} + \dfrac{d(\Delta p)}{2\Delta p}$ that is to say that a relative variation of the volume mass or of the calibration pressure is translated by half relative variation of the distance apart, that is the displacement. Moreover, these parameters influence only the gain of the flow-meter.

3. The passage section, for a given displacement, is independent of the centering of the cone in relation to the dome. Thus there is no real mechanical centering problem.

4. There is no solid friction which could create hysteresis. This results from the absence of necessity of strict centering and the use of a contactless displacement detector.

5. The force permitting the displacement is equal to the calibration pressure multiplied by the active area of the diaphragm. It can be 0.4 daN. As the weight of the spring and of the dome can easily be 50 times less, the reversal of the flow-meter will have upon the gain only an influence limited to 1% (cf.2). Likewise impacts and vibrations, once the flow-meter is filled, will have only a very slight influence. A device permitting of cancelling the reversal effect consists of a float fast with the dome and cancelling the weight of the movable equipment in the fuel. Likewise the presence of bubbles in the detector, which can occasion only static pressure gradients below 0.5 mbars, will have only a very slight influence upon the standarisation.

Finally, if in the case of a differential pressure-measuring flow detector the quality of the diaphragm has much importance due to the variation of its characteristics affecting the zero and standardization, nothing of the kind applies in the present case since the calibration pressure gives rise to a very great force compared with the disturbance which can be brought about by a semi-toroidal diaphragm. In any case, this could affect the standardization only at the rate of a thousandth parts.

6. Zero stability: in order to supply a good cumulative measurement, it is appropriate to have excellent stability of the zero. For example, in a range of 0–50 l./h, it is necessary that the stability of the zero should be of the order of 0.1 l./h. or 0.2% of the whole scale. Two types of arrangements permit this.

Firstly, the zero is a mechanical zero since at rest the dome comes to rest on the cone. Moreover the coils are referenced in relation to the cone since they are fast therewith. Thus even if there is deformation of the body of the flow-meter, the distance at zero between the dome and the measuring coil will remain constant. Moreover as regards the displacement detector, it is of interest, in order to minimise the temperature drift of the zero, to arrange that for it there should be as good as possible an equilibration at zero. For this purpose, as seen, a stay-piece is disposed between the reference coil and the washer so that the distance between the latter and the reference coil at rest should be equal to the distance between the measuring coil and the dome. Taking account of the tolerances and the dimensioning of the parts, it is possible to obtain a spacing of 0.05 mm. in a series production (0.1 mm. would be tolerable).

Figure 3:
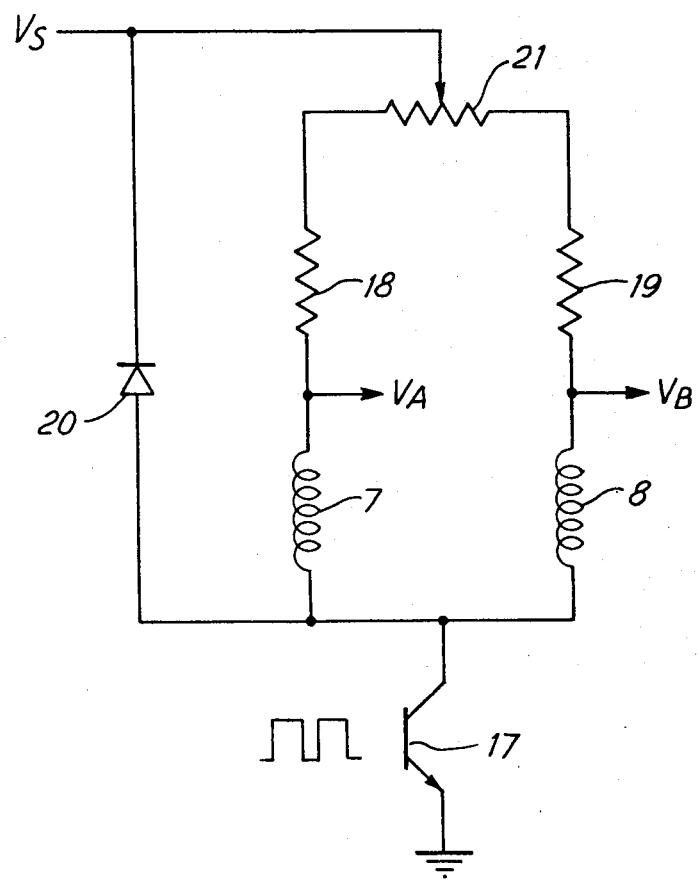
FIG. 3 shows a detail of the preferred displacement transducer.

Furthermore, in the preferred form of embodiment, the displacement detector is an eddy-current detector, the principle of which is recalled in FIG. 3. The coils 7 and 8, in series respectively with the resistors 18 and 19 of substantially equal value, receive an applied square-wave voltage of fixed frequency and cyclic ratio through the intermediary of the transistor 17 and the free-wheel diode 20. The apparent inductance of the coil 7 is modified by the displacement of a non-magnetic metallic piece such as the dome 4. It is shown that it is particularly advantageous for the temperature stability of the zero to add to this basic assembly the potentiometer 21 which permits perfecting of the equilibration of the voltage $V_A$ and $V_B$ at zero.

The combination of these precautions permits of attaining a zero drift below 0.2% in the temperature range.

7. Hysteresis and repeatability: the hysteresis is nil and the repeatability is perfect provided that the surface conditions of the cone and of the hole in the dome are excellent. With these small dimensions it is possible to obtain a polished surface condition at minimal cost. In fact it is necessary that at zero the dome should find its natural position of equilibrium with the least possible solid friction.

8. At very low flow rates, below 2 l./h., the influence of the losses by viscosity is great and it increases the displacement of the dome, causing a non-linearity in this zone. The approximate formula which takes account of the losses by viscosity is the following:

$$(G) \quad \frac{1}{\pi Re^2}\left(\frac{3}{16}\rho\frac{qv^2}{\pi R} + \frac{96\mu\lambda qv}{13e}\right) = \Delta p$$

wherein
$\mu$ = dynamic viscosity
$\lambda$ = viscous passage length
Thus the term $$\frac{96\mu\lambda qv}{13e}$$

is the term of viscosity which has the effect that at low flow rates the values of e are higher than the values given by formula (D).

Several solutions are possible for re-establishing linearity at low flow rates:
 to organise a known leakage of the valve or pierce a hole in the dome in order to offset the fluidic response curve;
 to effect an electronic compensation either by action upon the linearity of the electronic part at low flow rates, or simply by shifting the zero.
The results are comparable.

9. Adequacy of the preferred displacement detector: the eddy-current displacement detector is particularly adapted since it combines the following qualities:
 very low cost for exceptional performance,
 no contact with the element the displacement of which is to be measured,
 very low zero drift,
 sensitivity in accordance with the full-scale displacement of the movable element-app. 1 mm. for 50 l./h. and for a hole of diameter 4 mm.,
 taking account of the mean value of the displacement of the dome, which permits improving performances as regards repeatability,
 possibility of integration, at the electronic level, of the thermal compensations aiming at diminishing the drift due for example to the temperature variation of the volume mass of the fluid. Other compensations are possible.

10. Protection valve: for reasons of protection of the diaphragm, a non-return valve can be fitted at the exit of the flow-meter to avoid the pressure rising in the upper chamber 12. Likewise a filter can be incorporated in the flow-meter.

11. Impossibility of obstruction: if it should occur that the valve formed by the cone and the dome should be blocked for any hardly imaginable reason, the static pressure of the fuel pumps being at least 300 mbars, the opening force on the valve would then rise to 5 daN, which removes all risk of sticking or jamming.

12. Return to the tank: for various reasons it may be desirable that the pump should deliver constantly. In that case a return to the tank is necessary after the pump. A calibrated outlet orifice formed in the lower chamber 11 permits realizing the return to the tank and even a certain degassing, without interfering with measurement.

13. Pulsating flow: the movable equipment and the pressure loss constitute an excellent filter which smoothes out irregularities of the flow. Likewise this assembly permits large momentary flow rate overloads.

14. Presence of bubbles: when bubbles pass the valve, at the nominal volume flow rate, the displacement e of formula (D) is about 25 times less than for the liquid. If 20% of the flow is constituted by bubbles, the error on the cumulative flow rate will be of the order of 0.8%.

In summary, this flow-meter responds perfectly to the list of specifications fixed at the outset for the measurement of fuel flow rate in automobiles. Due to its performances, the invention can be utilised in other fields; the application has no limitative character, but is of interest in various industrial fields and also with regard to the measurement of fuel consumption in domestic and professional boilers for example.

We claim:

1. A flow-meter having a pressure loss substantially independent of flow rate of a fluid, comprising a hermetic enclosure having a first and second chambers, an entry orifice formed in the first chamber for receiving fluid, the flow rate of which is to be measured, an exit orifice formed in the second chamber for passage of the measured fluid, a movable element separating said chambers, said movable element permitting the monitoring of the fluid flow by linear displacement thereof and comprising a circular, flat rigid dome pierced with a central hole and connected to the body of the enclosure via a flexible seal, a cone having an apex of at least 45° and held within the enclosure body, the axis of said cone being perpendicular to the plane of the dome and passing through the center of said dome, means for exerting an almost constant force upon the dome to apply the edge of the hole of the dome to the cone and permitting the displacement of the dome in the direction of the axis of the cone, and contactless non-displaceable transducer means for converting the said displacement of said dome away from said cone into a signal representing the flow rate, said transducer means including at least one coil surrounding said cone.

2. A flow-meter according to claim 1, wherein the means for exerting an almost constant force upon the dome are constituted by a precompressed helical spring.

3. A flow-meter according to claim 1, wherein a defined leakage is provided between the two chambers.

4. A flow-meter according to claim 1, wherein the transducer means includes an eddy-current transducer element incorporating said coil.

5. A flow-meter according to claim 1, wherein the said transducer means includes electronic linearisation means.

6. A flow-meter according to claim 1, wherein the cone and the body of the enclosure form part of one and the same piece produced by moulding.

7. A flow-meter having a pressure loss substantially independent of flow rate of a fluid, comprising a hermetic enclosure having first and second chambers, an entry orifice formed in the first chamber for receiving fluid, the flow rate of which is to be measured, an exit orifice formed in the second chamber for passage of the measured fluid, a movable element separating said chambers, said movable element permitting the monitoring of the fluid flow by linear displacement thereof and comprising a circular, flat rigid dome pierced with a central hole and connected to the body of the enclosure via a flexible seal, a cone having an apex of at least 45° and held within the enclosure body, the axis of said cone being perpendicular to the plane of the dome and passing through the center of said dome, means for exerting an almost constant force upon the dome to apply the edge of the hole of the dome to the cone and permitting the displacement of the dome in the direction of the axis of the cone, and contactless nondisplaceable transducer means for converting the said displacement of said dome away from said cone into a signal representing the flow rate, the transducer means including an eddy-current transducer element.

* * * * *